No Printed Specification Available
6795X
W. GODDARD.
PORTABLE OVEN FOR ROASTING AND BAKING.
Patented Oct. 12, 1831.
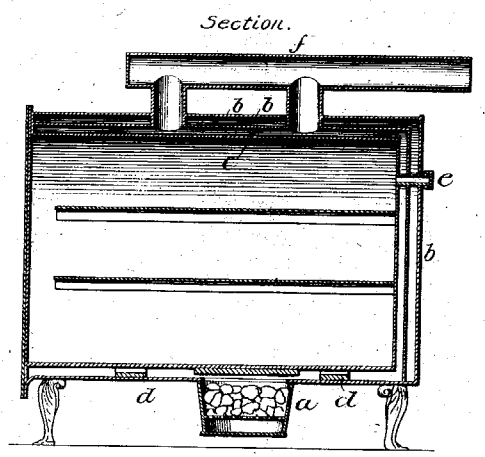
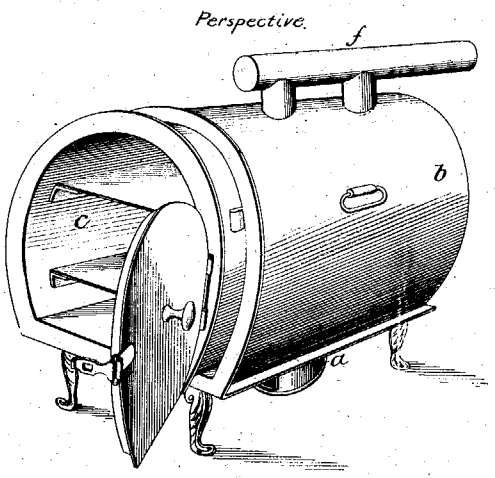
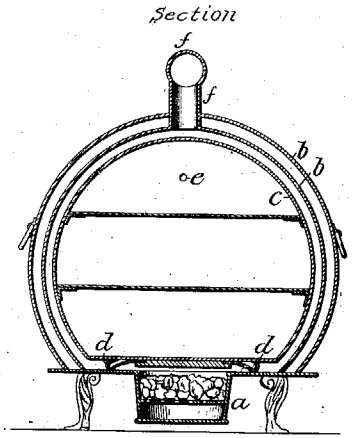
a, Furnace.
b, Outer cylinder and lining may be filled with nonconducting substance.
c, Inner cylinder.
d, Supporters of iron.
e, Tube and stopper.
f, Flue.

No Printed Specification Available
6795X
W. GODDARD.
PORTABLE OVEN.
Patented Oct. 12, 1831.
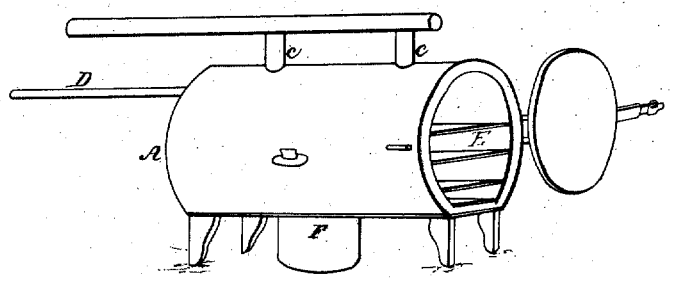
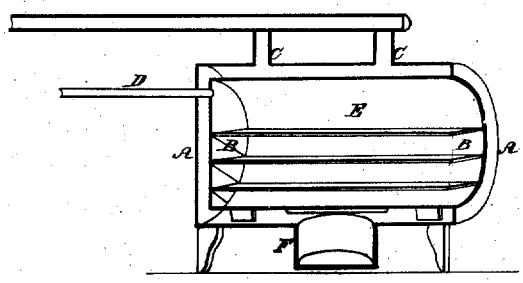

William Goddard, Portsmouth, New Hampshire

Letters Patent.

The schedule referred to in these Letters Patent, and
making part of the same, containing a description in the words
of the said William Goddard himself of his improvements
called the "New Portable Oven" for Roasting and baking.

To all to whom these presents shall come.
Be it known that I William Goddard of Portsmouth, in the County of Rockingham
and State of New Hampshire, have invented a New and useful improve
ment in the "Oven;" and that the following is a full and exact description of
the construction and operation of the said improved oven as invented by
me. First. I take a piece of thin Russia sheet iron or tin plates so united
as to form an oblong square of sufficient size to form the outside of the
oven except the bottom — the width of this plate being the length of the oven.
This plate is then turned cylindrically until the shape of its ends is that
of the greater segment of a circle (thus ◠). a flat sheet iron bottom of
suitable thickness is then rivetted on the edges of the plate so as to
make the whole of the form of a cylinder with one side flat, which
side is the bottom. a hole is then cut in the centre of the bottom of the
same diameter as that of the inner circumference of the furnace
of the furnace to be used in heating the oven. a flat ring of wrought
or cast iron from two to three inches in width is rivetted around
this aperture to give it strength and durability. Two holes from 1&2
inches in diameter, are cut with a punch in the upper part of the cy-
lindrical side or top, one near each end, as apertures for chimneys
and to equalize the heated air over the oven to be enclosed. a piece of sheet
iron or tin plate similar in shape to the one first described and of
suitable size, to form, when bent cylindrically, a lining to the cylinder
before mentioned except the bottom, is inserted in such manner as
to leave a space between said lining and the outside of from [illegible]

to

6795X to 1 inch, which space may be closed at the ends by bending the front and back edges of the lining and rivetting them to the outer plate or by a rim of sheet iron or tin of corresponding size. Two holes are then made in the upper surface of the lining opposite and corresponding to the holes in the outer surface, the lower edges of the lining being also rivetted to the bottom. Through these holes in the top, flues or chimneys of sheet iron or tin are then inserted of sufficient length to create such a draught as is required for the combustion of the coal. These two chimneys are then connected by a horizontal funnel fitted with a damper and of a length to conduct the heated air or gas to any required outlet. a head of sheet iron or tin, either single (or lined, so as to leave a space between the two plates) is then fitted on and fastened to the end for the back of the oven. Near the top of this back a hole of sufficient size is cut with a punch to admit a tube for the escape of steam whenever required. The aforesaid spaces between the linings and outside covering may be filled with atmospheric air, wood ashes, powdered charcoal, or any other suitable nonconducting substance a piece of sheet iron of a similar shape to the two before mentioned is then bent into the same cylindrical form and of such sizes as to leave when inserted into the other cylinder a space from ½ to ¾ of an inch between the outside of this inner cylinder and the lining of the outer one. The inner cylinder having a bottom and end similar and corresp. nding to the bottom and end of the outer cylinder, except that the bottom of the inner one is whole. a hole is then made near the top of the end of the said inner cylinder, corresponding in every respect to the hole in the outer one. The inner cylinder just described is properly the oven & the outer cylinder, together with its lining forms a nonconducting cover or case. on the centre of the bottom of the oven is secured a plate of iron wrought or cast for the purpose of defending the bottom from the direct heat of the furnace below. Supporters of iron are next fixed on the bottom of the inner cylinder or oven at suitable distances for the purpose of

6795 X of keeping it in its proper position in the centre of the outer cylin-
der or case and preserving the space around for the passage of
the heated air. a suitable rim of sheet iron or tin is then rivetted
on to the front end of the oven (whose edges are bent inwards
or outwards for the purpose) in order to close the space between
the inner & outer cylinders and to serve as a frame for the door,
and is secured in such manner to the edge of the outer covering as
to allow the oven to be withdrawn without much expense or
trouble when repairs become necessary. a tube is next inserted
through the apertures at the back of the oven fitted with a suitable
stopper so that the tube may be open or closed at pleasure. The
door may also be double & made of sheet iron or tin or of sheet
iron lined with tin. The usual apparatus inside, including
a false bottom of sheet iron, handles at the top, and legs either
fixed (or movable by means of a thumb screw so as to adapt the
height of the bottom to the height of the furnace) complete the ov
whole. The above described oven may be made of any other form
or size upon the same principle.

Portsmouth Sept. 30th 1831. Ent.

Witnesses William Goddard W.G.
Daniel Knight
Hampden Cutts

1053 Words]

(Patented 12 October 1824)
[illegible] 4. 1831